United States Patent
Yu

(10) Patent No.: US 7,639,306 B2
(45) Date of Patent: Dec. 29, 2009

(54) DIGITAL CAMERA MODULE WITH ZOOM FUNCTION AND FOCUSING FUNCTION

(75) Inventor: Sheng-Jung Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 449 days.

(21) Appl. No.: 11/309,258

(22) Filed: Jul. 20, 2006

(65) Prior Publication Data

US 2007/0115375 A1  May 24, 2007

(30) Foreign Application Priority Data

Nov. 18, 2005 (TW) .............................. 94140602 A

(51) Int. Cl.
*H04N 5/225* (2006.01)
(52) U.S. Cl. ................................................... 348/374
(58) Field of Classification Search ............ 348/207.99, 348/222.1, 240.1, 240.2, 240.3, 374
See application file for complete search history.

(56) References Cited

U.S. PATENT DOCUMENTS 4,676,605 A * 6/1987 Toda et al. ................. 359/696

2006/0125950 A1 * 6/2006 Chen ........................... 348/345
2006/0133794 A1 * 6/2006 Chen ........................... 396/268
2006/0268132 A1 * 11/2006 Oshima .................... 348/240.3

FOREIGN PATENT DOCUMENTS

CN          100416328 C         8/2006

* cited by examiner

*Primary Examiner*—Nhan T Tran
*Assistant Examiner*—Akshay Trehan
(74) *Attorney, Agent, or Firm*—Steven M. Reiss

(57) ABSTRACT

A digital camera module (100) includes a first sleeve (10), a first motor (20), a first barrel (30), a second sleeve (40), a second motor (50) and a second barrel (60). The first sleeve has at least one lens element (142) received therein. The first motor is received in the first sleeve. The first barrel has at least one lens element (32) received therein. The first motor engages with the first barrel and drives the first barrel to axially slide relative to the first sleeve. The second sleeve is located proximate to the first sleeve. The second motor is received in the second sleeve. The second barrel has at least one lens element (62). The second motor engages with the second barrel and drives the second barrel to axially slide relative to the second sleeve.

7 Claims, 1 Drawing Sheet

DIGITAL CAMERA MODULE WITH ZOOM FUNCTION AND FOCUSING FUNCTION

FIELD OF THE INVENTION

The present invention relates generally to a camera module with a zoom function and a focusing function, and more particularly, to a small-sized digital camera module with a zoom function and a focusing function.

DESCRIPTION OF RELATED ART

With the development of wireless communication technologies, increasing numbers of mobile phones and PDAs now include digital cameras as a special feature.

Generally speaking, digital cameras are image recording media capable of photographing images without using film. Such a digital camera typically uses an image pickup device, which is a kind of semiconductor device, such as a charged coupled device (CCD) or complementary metal oxide semiconductor (CMOS). In the digital camera, an object image formed on the image pickup device through a lens is converted into an electronic signal by the image pickup device, and the electrical signal is stored as a digital signal, for example, either in the camera unit or in a mobile phone or PDA in which the digital camera is mounted.

Since the digital camera is to be mounted in a small mobile phone or PDA, a fixed focus lens module is usually used to facilitate mounting thereof. However, images photographed by a digital camera module with a fixed focus lens module tend to be of poor quality. This is partly due to the fixed focus lens, which is incapable of adjusting distance between the lens and the image pickup device to make a clearer image when photographing objects at different distances from the camera. This is also due to the fixed lens, which is incapable of adjusting distance between the lens elements to change the focus of the digital camera module.

Whichever focusing structure or zoom structure needs a driving apparatus. A typical driving apparatus uses a gear or cam mechanism to realize the focusing or zoom function. This structure is relatively large and makes the camera structure very complicated. Furthermore, the mechanical structure consumes a substantial amount of energy. In addition, the precision of the mechanical transmission is not high.

Therefore, a digital camera with a zoom function and a focusing function is desired in order to overcome the above-described shortcomings.

SUMMARY OF THE INVENTION

In one embodiment thereof, a digital camera module includes a first sleeve, a first motor, a first barrel, a second sleeve, a second motor and a second barrel. The first sleeve has at least one lens element received therein. The first motor is received in the first sleeve. The first barrel has at least one lens element received therein. The first motor is configured for engaging with the first barrel and drives the first barrel to axially slide relative to the first sleeve. The second sleeve is located proximate to the first sleeve. The second motor is received in the second sleeve. The second barrel has at least one lens element. The second motor engages with the second barrel and drives the second barrel to axially slide relative to the second sleeve.

Other advantages and novel features will become more apparent from the following detailed description when taken in conjunction with the accompanying drawings.

BRIEF DESCRIPTION OF THE DRAWINGS

Many aspects of the digital camera module with the zoom function and focusing function can be better understood with reference to the following drawing. The components in the drawing are not necessarily drawn to scale, the emphasis instead being placed upon clearly illustrating the principles of the digital camera module with the zoom function and the focusing function. Moreover, in the drawing, like reference numerals designate corresponding parts throughout.

DETAILED DESCRIPTION OF THE INVENTION

Figure 1:
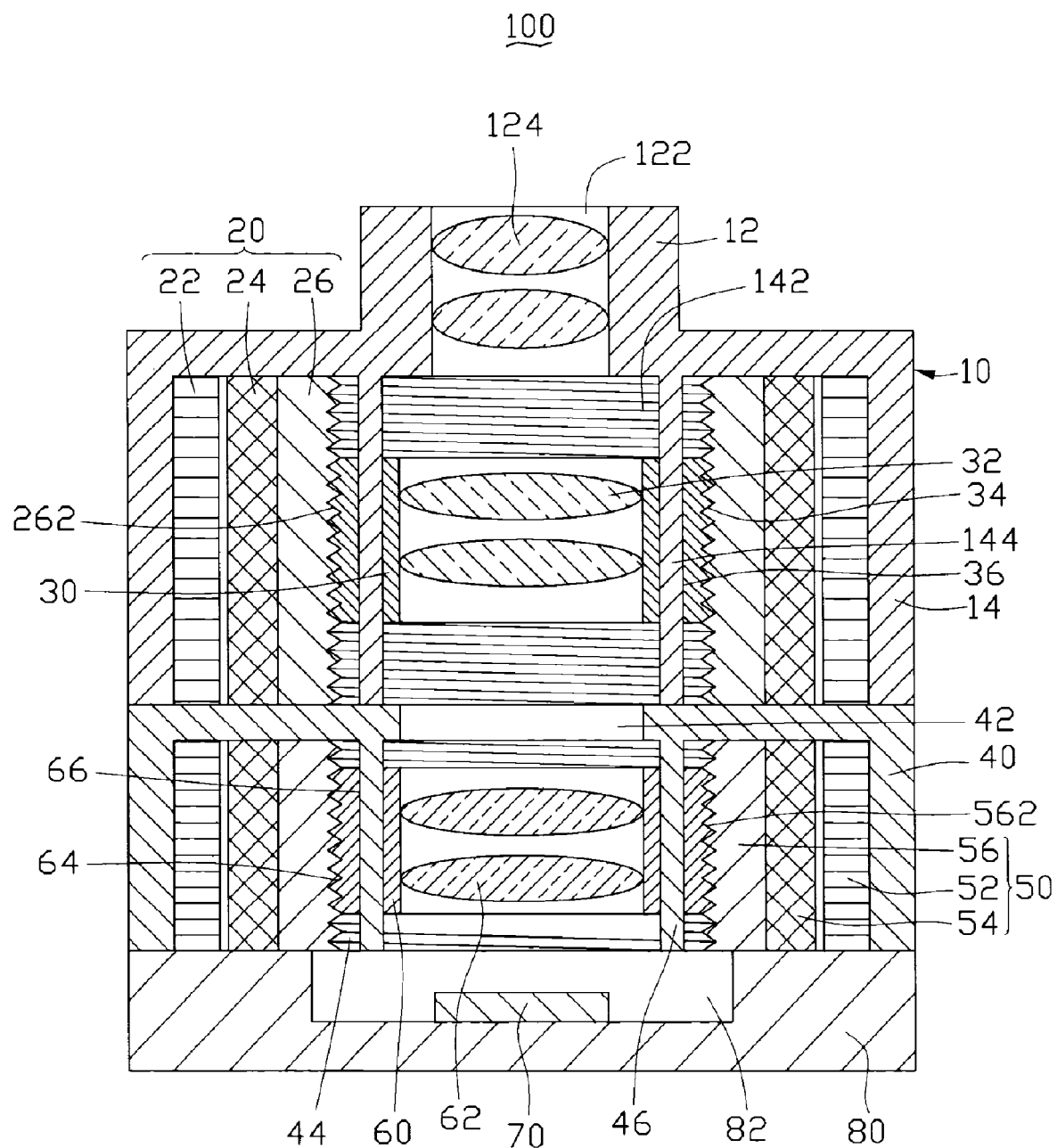
FIG. 1 is a cut-away view of an embodiment of a digital camera module with a zoom function and a focusing function.

Referring now to the drawing, FIG. 1 shows a digital camera module 100 with a zoom function and a focusing function, according to a preferred embodiment. The digital camera module 100 is adapted for use in a portable electronic device such as a mobile phone or a personal digital assistant (PDA), but the compact nature thereof could prove useful in compact digital camera units, digital camcorders or regular film cameras as well. The digital camera module 100 includes a first sleeve 10, a first motor 20, a first barrel 30, a second sleeve 40, a second motor 50, a second barrel 60, an image sensor 70 and a base seat 80.

The first sleeve 10 includes a flange 12 and a sleeve body 14 formed together. The flange 12 is formed at a top end of the sleeve body 14. The flange 12 has a through hole 122 defined in a middle thereof. Several lens elements 124 are set in the through hole 122 of the flange 12, and receive light that enters from the outside. The sleeve body 14 is a hollow cylinder, and includes a receiving hole 142 cooperatively defined by an inner periphery wall and a bottom wall. The through hole 122 communicates with the receiving hole 142 of the sleeve body 14 so that light can be transmitted therethrough. An axis of the through hole 122 is aligned with that of the receiving hole 142, and a diameter of the through hole 122 is smaller than that of the receiving hole 142. Two spaced arms 144 perpendicularly extend from the bottom wall of the sleeve body 14. Each arm 144 is substantially a long rectangular prism, and a free end of the arm 144 is coplanar with one end of the sleeve body 14 opposite to the flange 12.

The first motor 20 is received in the receiving hole 142 of the sleeve body 14. The first motor 20 includes a plurality of winding coils 22, a magnet 24 and a rotor 26. The winding coils 22 form a hollow cylinder, and are mounted on the inner periphery wall of the sleeve body 14. The winding coils 22 are electrically connected to a power supply of the digital camera module 100. The magnet 24 is tubular in shape. The magnet 24 is received in the winding coils 22, and may rotate relative to the winding coils 22. The rotor 26 is a substantially hollow cylinder, and an inner periphery wall of the rotor 26 defines an inner thread 262. An outer periphery wall of the rotor 26 is fixed on the inner periphery of the magnet 24. If the winding coils 22 are energized by current, the winding coils 22 produce a magnetic field. The magnetic field drives the magnet 24 with the rotor 26 to rotate together.

The first barrel 30 is substantially a hollow cylinder with two open ends so that light can be transmitted therethrough. The first barrel 30 is positioned in the rotor 26. Zoom lens elements 32 are set in the first barrel 30. An optical axis of the zoom lens elements 32 is aligned with an optical axis of the lens elements 124. The first barrel 30 defines an outer thread 34 at an outer periphery wall thereof. The outer thread 34 may engage with the inner thread 262. The first barrel 30 defines two through cutouts 36 for slidably receiving two arms 144 of the first sleeve 10.

The second sleeve 40 is a hollow cylinder, and an outer diameter of the second sleeve 40 is the same as that of the sleeve body 14 of the first sleeve 10. One end of the second sleeve 40 defines an opening 42, the other end of the second sleeve 40 defines a containing hole 44. Two arms 46 extend from a bottom of the second sleeve 40. Each free end of the arms 46 is coplanar with one end of the second sleeve 40.

The second motor 50 is received in the containing hole 44, and also includes a plurality of winding coils 52, a magnet 54 and a rotor 56. The structures of the winding coils 52, the magnet 54 and the rotor 56 are substantially similar to those of the first motor 20 mentioned above. The difference is that the second motor 50 has a smaller volume than the first motor 20. Accordingly, the second motor 50 may be driven by less power.

The second barrel 60 is substantially a hollow cylinder with two open ends so that light can be transmitted therethrough. The second barrel 60 is positioned in the rotor 56. Focusing lens elements 62 are set in the second barrel 60. An optical axis of the focusing lens elements 62 is aligned with an optical axis of the zoom lens elements 32. The second barrel 60 defines an outer thread 64 at an outer periphery wall thereof. The outer thread 64 engages with the inner thread 562. The second barrel 60 defines two through cutouts 66 for slidably receiving two arms 46 of the second sleeve 40.

The image sensor 70 can be a charge-coupled device (CCD) or a complementary metal-oxide semiconductor (CMOS). The image sensor 70 may convert the optical image data of an object into electronic signals.

The base seat 80 is a long cube, and defines a cavity 82 for receiving the image sensor 70. The base seat 80 may be mounted under the second sleeve 40 for supporting the second sleeve 40.

In assembly, the first motor 20 is placed in the first sleeve 10, and the winding coils 22 are mounted on the receiving hole 142 of the first sleeve 10. The magnet 24 and the rotor 26 are fixed each other, and are received in the winding coils 22. Then, the arms 144 are inserted into the cutout 36 of the first barrel 30, with the outer thread 34 of the first barrel 30 engaging with the inner thread 262 of the rotor 26. The second motor 50 is placed in the second sleeve 40, and the winding coils 52 are mounted on the containing hole 44 of the second sleeve 40. The magnet 54 and the rotor 56 are fixed to each other, and are received in the winding coils 52. The arms 46 of the second sleeve 40 are inserted into the cutout 66 of the second barrel 60, with the outer thread 64 of the second barrel 60 engaging with the inner thread 562 of the rotor 56. After that, one end of the first sleeve 10 opposite to the flange 12 is fixed on the second sleeve 40 by means of adhesion and/or welding. The image sensor 70 is mounted in the base seat 80 by means of adhesive. The image sensor 70 aligns with the axis of the first barrel 30 and the second barrel 60. Finally, the second sleeve 40 with the first sleeve 10 is fixed on the base seat 80. The assembly process of the digital camera module 100 is thus completed.

When taking pictures, the light reflected from an image object (not shown) pass through the lens elements 124, the zoom lens elements 32 and the focusing lens elements 62. The lens elements 124, 32 and 62 focus the light, after which the light arrives at the image sensor 70. The image sensor chip 70 transforms the light signal into an electronic signal, permitting the storage of the image information in a memory of the digital camera 100. As such, the photographic process is finished. If the image is too far away, the user may activate the zoom function. The winding coils 22 are energized by current and the winding coils 22 produce a magnetic field. The magnetic field drives the magnet 24 with the rotor 26 to rotate together. The rotor 26 further brings the first barrel 30 to rotate. However, the first barrel 30 cannot rotate, because the first barrel 30 is limited in movement by the arms 144 of the first sleeve 10. Thus, the first barrel 30 only slides along the arms 144 relative to the first sleeve 10. Accordingly, the distance between the zoom lens elements 32 of the first barrel 30 and the lens element 124 is changed, thereby resulting in the stable telescopic movement of the first barrel 30. The focus distance is thus changed so that a distant object can be imaged in the image sensor 70.

After zooming, if the image should prove not to be clear enough (i.e. out of focus), the user may activate the focusing function. The driving principle is similar to the zoom operation. The winding coils 52 are energized by current, and the winding coils 52 produce a magnetic field. The magnetic field drives the magnet 54 with the rotor 56 to rotate together. The rotor 56 further brings the second barrel 60 to rotate. However, the second barrel 60 cannot rotate, because the second barrel 60 is limited in movement by the arms 46 of the second sleeve 40. Thus, the second barrel 60 only slides along the arms 46 relative to the second sleeve 40. Accordingly, the distance between the focusing lens elements 62 and the image sensor 70 is changed, thereby resulting in the stable telescopic movement of the second barrel 60. The image distance is changed so that a distant object can be imaged in the image sensor 70. When the image becomes clear, the second barrel 60 stops sliding. The second barrel 60 is kept in the focusing position because of the limitation influence of the thread. Thus, the focusing purpose is achieved by changing the distance between the image sensor 70 and the second barrel 60.

In alternative embodiments, the first sleeve 10 and the second sleeve 40 may be formed together, and a middle portion is formed on the inner periphery of the sleeve and separates the sleeve portion to be a first sleeve portion and a second sleeve portion. Understandably, the arms of the first sleeve and the second sleeve are connected each other.

As described above, the preferred embodiment provides a digital camera module 100 with a zoom function and a focusing function for devices such as mobile phones, which has both simplicity and ease of use. It is, however, to be understood that the digital camera module 100 could potentially be useful in other applications in which it may be desirable to allow incoming light to be adjusted so as to attain a clear image.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A digital camera module, comprising:
a first sleeve having at least one lens element received therein;
a first motor received in the first sleeve, the first motor including at least one first winding coil and a driven element having a first magnet facing the at least one first winding coil;
a first barrel having at least one zoom lens element received therein, the driven element being engaged with the first barrel, the magnetism action between the at least one first winding coil and the first magnet driving the driven element to rotate relative to the first barrel, driving the first barrel to axially slide relative to the first sleeve;

a second sleeve located proximate to the first sleeve;

a second motor received in the second sleeve, the second motor including at least one winding coil, a magnet and a rotor, the at least one winding coil being received in the second sleeve, the magnet and the rotor being fixed to each other and being spaced from the at least one winding coil, the magnet and the rotor being configured to rotate relative to the at least one winding coil; and a second barrel having at least one focusing lens element, the second motor engaging with the second barrel and the rotor being threaded with the second barrel, the second motor driving the second barrel to axially slide relative to the second sleeve.

2. The digital camera module as claimed in claim 1, wherein two arms extend from the second sleeve, and the second barrel defines two through cutouts, each arm engages in a corresponding cutout so as to limit the rotation of the first barrel.

3. The digital camera module as claimed in claim 2, wherein each arm forms a long rectangular prism so as to be slidably received in a corresponding cutout.

4. A digital camera module comprising:

a sleeve having a first sleeve portion and a second sleeve portion axially aligning with each other;

a first motor including a first stator coil configured for producing a first magnetic field, and a first rotor assembly for interacting with the first magnetic field, the first stator coil forming a hollow cylinder mounted to an inner peripheral surface of the first sleeve portion, the first rotor assembly including a first magnetic portion on an outer periphery thereof, and a first rotor thread portion on an inner periphery thereof, the first magnetic portion being received in the first stator coil in a manner so as to be rotatable relative to the first sleeve portion under the effect of the first magnetic field;

a first barrel having a first barrel thread on an outer periphery thereof, the first barrel thread engaging with the first rotor thread in a manner such that the first barrel is axially movable relative to the first rotor assembly when the first rotor assembly rotates, the first barrel having a zoom lens received therein;

a second motor including a second stator coil configured for producing a second magnetic field, and a second rotor assembly for interacting with the second magnetic field, the second stator coil forming a hollow cylinder mounted to an inner peripheral surface of the second sleeve portion, the second rotor assembly including a second magnetic portion on an outer periphery thereof, and a second rotor thread portion on an inner periphery thereof, the second magnetic portion being received in the second stator coil in a manner so as to be rotatable relative to the second sleeve portion under the effect of the second magnetic field;

a second barrel having a second barrel thread on an outer periphery thereof, the second barrel thread engaging with the second rotor thread in a manner such that the second barrel is axially movable relative to the second rotor assembly when the second rotor assembly rotates, the second barrel having a focusing lens received therein, the focusing lens being aligning with the zoom lens; and an image sensor arranged so as to receive light transmitted through the zoom lens and the focusing lens.

5. The digital camera module as claimed in claim 4, wherein a middle portion is formed on the inner periphery of the sleeve and separates the first sleeve portion and the second sleeve portion.

6. The digital camera module as claimed in claim 4, wherein the axial length of the first stator coil is greater than the axial length of the second stator coil.

7. The digital camera module as claimed in claim 4, wherein two arms extend from the sleeve, the first barrel defines two through first cutouts, the second barrel defines two through second cutouts, each first cutout is aligned with a corresponding second cutout, each arm engages in a corresponding cutout.

* * * * *

UNITED STATES PATENT AND TRADEMARK OFFICE
CERTIFICATE OF CORRECTION

PATENT NO. : 7,639,306 B2  Page 1 of 1
APPLICATION NO. : 11/309258
DATED : December 29, 2009
INVENTOR(S) : Sheng-Jung Yu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this

Ninth Day of November, 2010

David J. Kappos
*Director of the United States Patent and Trademark Office*